FRASER & McLELLAN.
Wheel-Cultivator.
No. 21,128. Patented Aug. 10, 1858.
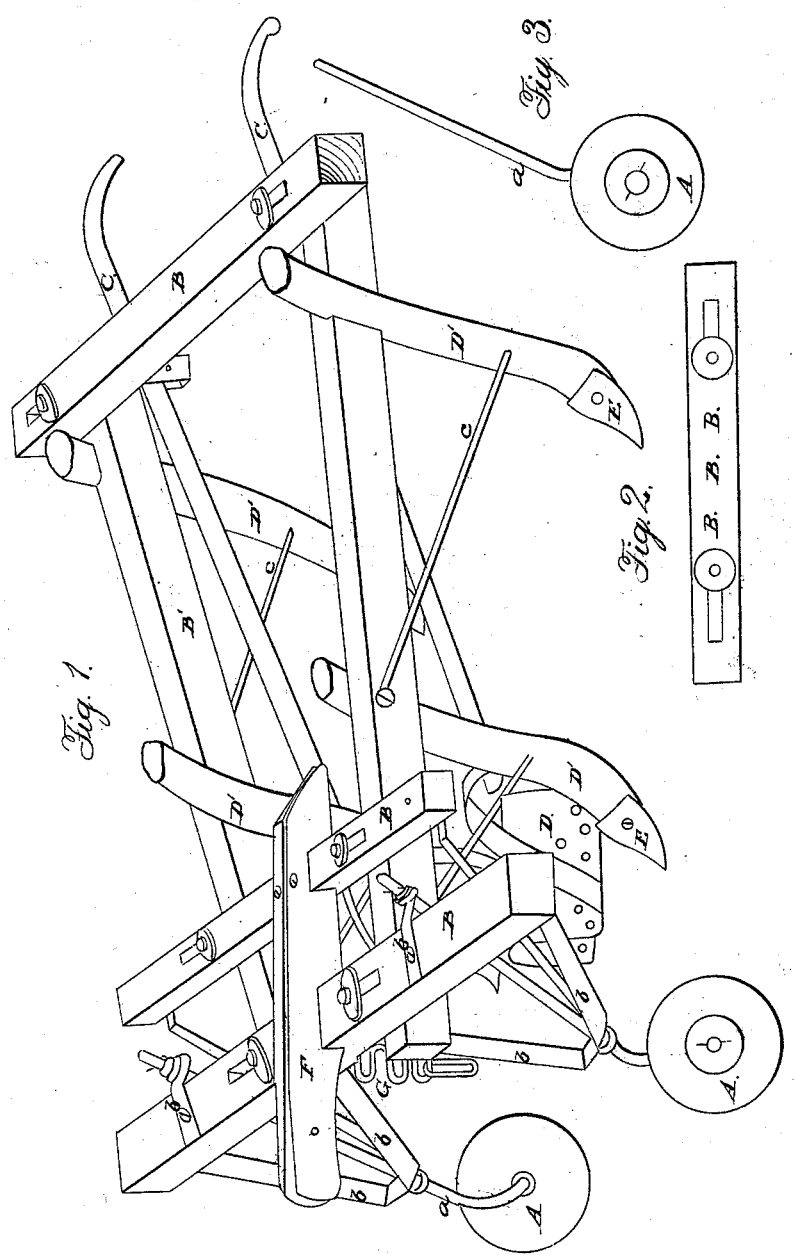

UNITED STATES PATENT OFFICE.

N. W. FRASER AND A. J. McLELLAN, OF LA PORTE, INDIANA.

IMPROVEMENT IN CULTIVATORS.

Specification forming part of Letters Patent No. 21,128, dated August 10, 1858.

*To all whom it may concern:*

Be it known that we, N. W. FRAZER and A. J. McLELLAN, of the county and town of La Porte, and State of Indiana, have invented certain new and useful Improvements in Cultivators; and we do hereby declare that the following is a full and exact description thereof, reference being had to the accompanying drawings, and to the letters of reference marked thereon.

Figure 1 is a perspective view. Fig. 2 is a top view of one of the cross-bars B, showing the slots; Fig. 3, view of wheel and vertical shaft.

The nature of our invention consists in the manner of arranging the shield, together with the shovels and the two revolving wheels, as hereinafter described.

To enable others skilled in the art to make and use our invention, we will describe its construction and operation.

In constructing our invention, A are the wheels; a, the vertical shafts on which the wheels rotate, and which shafts pass through braces d and b, attached to the frame B, for the purpose of keeping said shafts in position, and allowing them at the same time with the wheels to rotate; B, cross-pieces slotted to allow for adjusting side pieces, B', to which are fastened the standards to which the shovels are attached; C, the handles; D, the fender; D', the standards; E, the shovels; F, the hounds, to which the guide-pole is fastened by means of a bolt; G, the clevis to which the draft is applied; c, braces from the beam B' to the standard D'.

In the operation of our invention the draft is applied to the machine at G, while the guide-pole serves for the purpose of guiding the same. The wheels A are for the purpose of bearing up the machine and regulating its depth, also to enable it to turn in any direction or move in any required line, as the wheels, in addition to revolving forward or backward, will revolve laterally, enabling us to turn it readily; or by the operator elevating the handles the shovels may be raised entirely out of the ground, the fore end of the machine resting on the wheels only, so as to be moved to any desired point. The depth is regulated by placing the washer on the vertical shaft a above or below the guards b b, which raises or lowers the cultivator. The fender D is for the purpose of protecting the young corn, and passes directly over the row while the shovels are brought close up to it, thus cleansing the soil of weeds and grass and opening it near the young corn without any injury thereto from the falling of the soil upon it. When the corn becomes too high to need the shield it can be removed and the cultivator be used without it; or the cultivator can be so compressed as to run between the rows and cultivate between them. The handles are also adjustable, and can be raised or lowered at pleasure. The draft as to height is regulated by raising or lowering the point of draft by means of the clevis G.

It will be seen that the great advantages which we give are the facility of guiding or turning our invention and of regulating the depth by means of wheels A; also the early opportunity of cultivating the young corn before the grass has become injurious to it by means of the fender, and the adjustability of the shovels in combination with it, thus enabling us to cultivate the corn when young without injuring it.

Having thus fully described the construction and operation of our invention, what we claim as new, and desire to secure by Letters Patent, is—

The arrangement of the fender D, attached to the shovel-standards D', the shovels E, and the wheels A on the vertical shafts a, the whole being arranged for joint operation as above set forth and described.

N. W. FRASER.
A. J. McLELLAN.

Witnesses as to signature of N. W. Fraser:
  T. G. CLAYTON,
  GEORGE W. PARKER.

Witnesses as to signature of A. J. McLellan:
  GEO. CRAWFORD,
  A. TUCKER.